Patented July 6, 1926.

1,591,652

UNITED STATES PATENT OFFICE.

BRUCE K. BROWN AND CHARLES BOGIN, OF TERRE HAUTE, INDIANA, ASSIGNORS TO COMMERCIAL SOLVENTS CORPORATION, OF TERRE HAUTE, INDIANA, A CORPORATION OF MARYLAND.

CELLULOSE ACETATE COMPOSITION.

No Drawing.      Application filed October 14, 1925. Serial No. 62,449.

This invention relates to the production of films and lacquers from cellulose esters, and pertains specifically to cellulose acetate compositions.

Nitrocellulose has found a much broader use in industry than has its companion cellulose ester—cellulose acetate—partly because of its inherent cheapness, but also on account of the fact that nitro-cellulose is easily dissolved in a wide variety of solvents and is compatible, in solution, with solutions of other materials; whereas cellulose acetate solvents are few in number and cellulose acetate is difficultly compatible with other materials when in solution.

For example, the modern nitrocellulose lacquer actually consists of a liquid mixture containing various varnish gums in solution, as well as the nitrocellulose. These varnish gums—such as dammar, ester, kauri, shellac, etc., serve a real purpose in the lacquer, in that they add body, covering-power, adherence, and durability to the lacquer without greatly increasing the viscosity of the solution. It is frequently the case that the solvents which dissolve these gums are not solvents for nitrocellulose, but in such cases the nitrocellulose is dissolved in one solvent mixture and the gums in another. Persons skilled in the art find no great difficulty in blending these two solutions to form a good lacquer.

The use of cellulose acetate in lacquers has been greatly limited by the fact that gums could not be incorporated in the solutions. Even in the case of acetone-soluble gums, where it would appear that the cellulose acetate and gum might be dissolved in a mutual solvent, incompatibility has resulted. In some few cases, cellulose acetate and varnish gums may be incorporated in a liquid solvent mixture without the precipitation of one of the other of the dissolved ingredients, but in such cases, almost invariably incompatibility results during the evaporation of the solvents and an unhomogeneous fogged film results.

We have now discovered that certain new synthetic resins, which are substitutes for varnish gums such as have been previously mentioned, may be incorporated in cellulose acetate solutions and that these solutions may be employed to produce films, or as lacquers, without any phenomenon of precipitation or incompatibility. We have also discovered that cellulose acetate solutions containing these resins produce films and lacquers of a quality superior to those obtained from cellulose acetate per se.

The new synthetic resin which we employ in solution together with cellulose acetate for film and lacquer use are properly describable as "polyvalent metallic salts of alkyl half esters or phthalic acid". These compounds are described, and their method of manufacture is outlined in co-pending serial application #20,008 (1925), of which one of us is a joint inventor.

Briefly we may state that these compounds are prepared by reacting an aqueous solution of the sodium salt of an alkyl half ester of phthalic acid with an aqueous solution of a polyvalent metallic salt, whereupon there is precipitated the desired compound. For example, the sodium salt of the monobutyl ester of phthalic acid reacts with zinc chloride in accordance with the following equation,

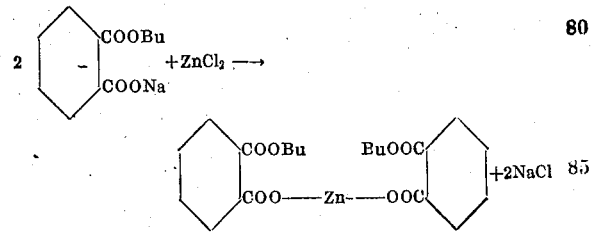

to form the zinc salt of the monobutyl ester of phthalic acid.

Salts of other polyvalent metals such as copper, lead, cadmium, iron, manganese, nickel, cobalt, etc., give similar compounds. Other alkyl half esters of phthalic acid may be employed—for example the ethyl, propyl, or amyl esters.

These compounds may be generally characterized as solid stable, neutral, resin-like substances, insoluble in water and soluble in organic solvents.

This class of compounds is generally suitable for employment in cellulose acetate compositions as will later be described. However, on account of the high melting points and stability of the compounds containing the normal butyl group, we prefer to employ polyvalent metallic salts of butyl half esters of phthalic acid in our improved cellulose acetate compositions.

Before proceeding to a description of our new and novel cellulose acetate compositions, we shall first describe briefly the salient properties of some of the "butyl" resins.

The zinc butyl resin is a friable transparent solid gum-like material which is so hard at room temperature that it may be pulverized like hard rosin. It softens with increased temperature and becomes liquid at about 150° C. It is soluble in all common organic solvents such as esters, alcohols, ketones, and hydrocarbons. It is insoluble in water. The cadmium butyl resin is similar to the zinc.

The lead butyl resin has properties similar to the zinc butyl resin, except that it is amber in color.

The ferric butyl resin is a ruby-red material with properties similar to the zinc butyl resin.

The cupric butyl resin is a brilliant azure-blue material of similar properties. We shall subsequently refer to these compounds as "alkyl metal resins."

We have now discovered that these alkyl metal resins are miscible with solutions of cellulose acetate in volatile solvents and that when the solvents are evaporated the residue of cellulose acetate and metal alkyl resin forms a clear homogeneous durable film. For example, the ferric, cadmium, zinc, and copper alkyl resins may be dissolved in solutions of cellulose acetate in acetone, diacetone alcohol, tetrachlorethane, ethyl, propyl, or butyl lactate or in mixtures of these solvents, or in other volatile, organic, cellulose acetate solvents. When used in suitable proportions these alkyl metal resins are valuable modifying ingredients for cellulose acetate films and lacquers.

To illustrate the use of these materials we may describe a cellulose acetate—resin lacquer as follows:

16 ounces of acetone-soluble cellulose acetate is dissolved in two quarts of a solvent mixture composed of 80% of a low-boiling cellulose acetate solvent, for example acetone; and 20% of a higher-boiling solvent such as diacetone alcohol, tetrachlorethane, or diacetone alcohol. 16 ounces of ferric alkyl resin or copper alkyl resin is dissolved in two quarts of an identical solvent mixture, and the two solutions are mixed to produce a lacquer.

On brush, spray, or dip application this lacquer serves to form a tough adherent durable film. If desired, the zinc or cadmium alkyl resins may be substituted, in slightly smaller proportions than that employed in the cases cited above, or other metal alkyl resins may be employed.

Frequently it is desirable to add a suitable non-volatile plasticizer to produce a more elastic or extensible film. Suitable plasticizers—such as dibutyl phthalate—may be employed in the solution in amounts up to 100% of the weight of the cellulose acetate. If desired a suitable pigment, dye, or lake may be incorporated in the lacquer.

The above example, while it relates specifically to cellulose acetate lacquers, is descriptive rather than limiting. Metal alkyl resins are useful ingredients in cellulose acetate films and cellulose acetate plastic masses. The same solvents used in cellulose acetate lacquer may be employed in producing films or plastics containing metal alkyl resins.

Now, having fully described our invention, we claim the following as new and novel:—

1. A composition of matter comprising cellulose acetate and a polyvalent metallic salt of an alkyl half ester of phthalic acid.

2. A composition of matter comprising cellulose acetate and a polyvalent metallic salt of the butyl half ester of phthalic acid.

3. A composition of matter comprising cellulose acetate and the ferric salt of an alkyl half ester of phthalic acid.

4. A composition of matter comprising cellulose acetate and the ferric salt of the butyl half ester of phthalic acid.

5. A composition of matter comprising cellulose acetate and a polyvalent metallic salt of an alkyl half ester of phthalic acid dissolved in volatile organic solvents.

6. A composition of matter comprising cellulose acetate and the ferric salt of an alkyl half ester of phthalic acid dissolved in volatile organic solvents.

7. A composition of matter comprising cellulose acetate and a polyvalent metallic salt of the butyl half ester of phthalic acid dissolved in volatile organic solvents.

8. A composition of matter comprising cellulose acetate and the ferric salt of the butyl half ester of phthalic acid dissolved in volatile organic solvents.

In testimony whereof we affix our signatures.

BRUCE K. BROWN.
CHARLES BOGIN.